April 17, 1962  C. BAUR ETAL  3,029,698
HIGH-POWER PHOTOGRAPHIC OBJECTIVE
Filed Oct. 21, 1958
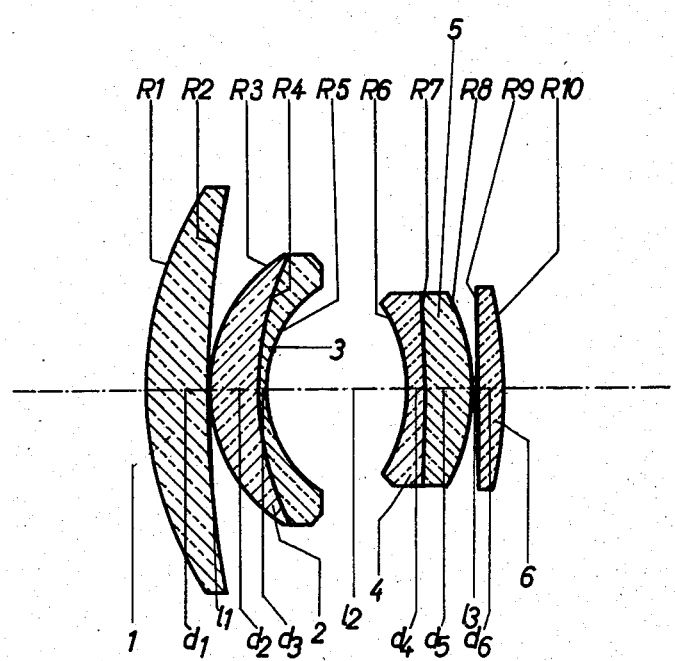
INVENTOR.
BY CARL BAUR
CHRISTIAN OTZEN

United States Patent Office 3,029,698
Patented Apr. 17, 1962

1

3,029,698
HIGH-POWER PHOTOGRAPHIC OBJECTIVE
Carl Baur, Munich-Baldham, and Christian Otzen, Munich, Germany, assignors to Firma Agfa Aktiengesellschaft, Leverkusen-Bayerwerk, Germany
Filed Oct. 21, 1958, Ser. No. 768,584
Claims priority, application Germany Oct. 26, 1957
3 Claims. (Cl. 88—57)

The present invention relates to a high-power photographic objective, and more particularly to a photographic objective which is particularly suited for use in a miniature camera in combination with a central shutter which is arranged between the objective and the image plane of the camera.

The photographic objective according to the present invention is fully corrected, has an aperture of at least 1:2, is capable of sharply focusing within an angle of field of at least 44°, and has a maximal rear intercept length of 67% of the focal length of the objective as a whole.

The objective of the present invention comprises four lens members axially spaced by air spaces. The two outer members are singlets, and the two inner members are cemented doublets which are arranged on opposite sides of a diaphragm.

Objectives of this type according to the prior art cannot be used in miniature cameras having a picture frame of 24 mm. by 36 mm. and a focal length of 50 mm. If a central shutter, such as an iris diaphragm shutter, having a maximal shutter blade diameter of 22.5 mm. is arranged between the objective and the image plane of a camera, the light intensity in the corners of the picture frame would be insufficient. The narrow opening screens a portion of the cone of light, and vignetting takes place.

In order to avoid vignetting, it would be necessary to make the diameter of the rear part of the objective very small, and to increase the diameter of the front part of the objective to such an extent that the required light passes without obstruction through the shutter, which is located behind the objective, and reaches the corners of the picture frame. The known photographic objectives of this type do not permit such an increase of the front part of the objective due to constructive difficulties regarding the thicknesses of the lenses, and also due to the fact that correction of the coma and of astigmatism could not be obtained. A substantial increase of the diameter of the front part of the objective for the purpose of increasing the opening for the cone of light for avoiding vignetting by the rearwardly located shutter, cannot be achieved since an increase of the diameter of the front part of the objective within the possible range would result in a rapid increase of the apertural error and in an unacceptable halation in the image zone. This error can only be avoided by setting the diaphragm to a smaller opening, for example 1:4 to 1:5.6. Due to these facts, the known objectives of this type cannot be used as exchangeable objectives for miniature cameras having a central shutter rearwardly of the objective.

It is one object of the present invention to provide a photographic objective of high power which is particularly suitable for use with a central shutter arranged rearwardly of the objective.

Another object of the present invention is to provide

2 a photographic objective having an aperture of at least 1:2 which can be used in a miniature camera.

Another object of the present invention is to provide a photographic objective which does not cause vignetting and halation when used with a rearwardly arranged central shutter in a miniature camera.

Another object of the present invention is to provide a photographic objective producing a sharply focused and bright image in the corners of the picture within a wide angular field.

A further object of the present invention is to provide a photographic objective of high power in which coma chromatic aberration astigmatism, distortion, and spherical aberration are corrected within a great angle of field.

With these objects in view, the present invention mainly consists in a photographic objective comprising two outer lens members, and two inner lens members in which the axial thicknesses of the outer members have a predetermined ratio, in which the radii of curvature of the forwardly located inner member have a predetermined ratio, and in which the axial air space between the inner members has a predetermined ratio to the axial thicknesses of the outer members.

A preferred embodiment of the photographic objective according to the present invention has a focal length of 50 mm. as is used in a camera having a picture frame of 24 by 36 mm. For an aperture greater than 1:2, the optically free diameter of the front part of the objective must be greater than a diameter corresponding to an aperture of 1:1.4, which corresponds to an increase of one stop, and the optically free diameter of the rear part of the objective must be not more than 42% of the focal length of the objective. In this manner, vignetting is completely prevented.

Full and even illumination and good marginal brightness of the picture is obtained, if the total axial length of the objective is between 67% and 73% of the focal length of the objective.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the single figure of the accompanying drawing showing a side view of an objective according to the present invention.

Referring now to the drawing, two outer lens members 1 and 6 are provided in front and in the rear of the objective, respectively, and spaced therefrom by air spaces $l_1$ and $l_3$ are two inner lens members 2, 3 and 4, 5, respectively, which are spaced from each other by an axial air space $l_2$.

The outer lens member 1 is a positive singlet having an axial thickness $d_1$. The front face of lens element 1 is convex to the front and has a radius of curvature $R_1$. The rear face of lens element 1 is concave to the rear and has a radius of curvature $R_2$.

The lens element 6 has an axial thickness $d_6$. The rear face of lens element 6 is convex to the rear and has a radius of curvature $R_{10}$. The front face of the lens element 6 is convex to the front and has a radius of curvature $R_9$.

The forwardly located inner member consists of a convergent lens element 2 cemented to a divergent lens element 3. Lens element 2 has a thickness $d_2$, and lens element 3 has a thickness $d_3$. The front face of lens element 2 is convex to the front and has a radius of curvature $R_3$. The cemented interfaces of lens elements 2 and 3 have a radius of curvature $R_4$. The rear face of lens element 3 is concave to the rear and has a radius of curvature $R_5$.

The rearwardly located inner member consists of a divergent lens element 4 and a convergent lens element 5. Lens element 4 has an axial thickness $d_4$, and lens element 5 has an axial thickness $d_5$. The front face of lens element 4 is concave to the front and has a radius of curvature $R_6$, the cemented interfaces of lens elements 4 and 5 have a radius of curvature $R_7$, and the rear face of lens element 5 is convex to the rear and has a radius of curvature $R_8$.

As explained above, the total axial length of the objective is between 67% and 73% of the focal length $f$ of the objective, which may be mathematically expressed as follows:

(1) $\quad 0.67f < d_1+d_2+d_3+d_4+d_5+d_6+l_1+l_2+l_3 < 0.73f$

In order to obtain full correction with a great front opening of the objective, the axial thickness $d_1$ of lens element 1 is greater than 1.5 times, and smaller than 3 times the thickness $d_6$ of lens element 6 which may be mathematically expressed as follows:

(2) $\quad 1.5 d_6 < d_1 < 3 d_6$

For correcting the coma and the chromatic aberrations, the radius $R_4$ of the cemented interfaces of lens elements 2 and 3 is greater than the radius $R_5$, but smaller than twice the sum of the radii $R_3$ and $R_5$, which may be mathematically expressed as follows:

(3) $\quad R_5 < R_4 < 2(R_3+R_5)$

In order to overcome curvature of a field, astigmatism, and coma, the axial air space $l_2$ must be less than 1.6 times the sum of the thicknesses $d_1$ and $d_6$ of the lens elements 1 and 6, which may be mathematically expressed as follows:

(4) $\quad l_2 < 1.6(d_1+d_6)$

Correction of the spherical aberration, coma, and astigmatism is further improved if the sum of the thicknesses $d_2$ and $d_3$ of lens elements 2 and 3, and also the sum of the thicknesses $d_4$ and $d_5$ of the lens elements 4 and 5, is greater than 0.5 times, but smaller than 0.8 times the sum of the thicknesses $d_1$ and $d_6$ of the lens elements 1 and 6, which may be mathematically expressed as follows:

(5) $\quad 0.5(d_1+d_6) < \left(\dfrac{d_2+d_3}{d_4+d_5}\right) < 0.8(d_1+d_6)$

The maximal rear intercept length of the objective is 67% of the focal length $f$ of the objective, which may be mathematically expressed as follows:

(6) $\quad s_0' < 0.67f$

The sum of the absolute values of the radii $R_5$ and $R_6$ is greater than 50% of the focal length of the objective, which may be mathematically expressed as follows:

(7) $\quad 0.5f < (R_5 + 1R_6 1)$

When the above conditions are fulfilled, an objective having an aperture of 1:1.9 is obtained which for a focal length of 50 mm. sharply focuses the corners of a picture frame of 24 by 36 mm. with perfect picture quality and excellent marginal brightness when used together with a central shutter having a maximum blade diameter of 22.5 mm. and arranged between the objective and the picture frame.

An iris diaphragm is preferably arranged between the lens elements 3 and 4.

The following example of a preferred embodiment is illustrative for photographic objectives according to the present invention.

*Example*

The aperture is 1:1.9, the total length of the objective is 0.71492, and the rear intercept length is 0.63664. The angle of field is 48°. The total focal length $f$ of the objective is $f=1.000$.

| Lens Elements | Radii | Thicknesses Air spaces | $n_D$ | $v$ |
|---|---|---|---|---|
| 1 | $R_1 = +0.73853.f$ | $d_1 = 0.12463.f$ | $n_1 = 1.72000$ | $v_1 = 50.31$ |
|   | $R_2 = +2.26782.f$ | $l_1 = 0.00103.f$ |   |   |
|   | $R_3 = +0.31446.f$ |   |   |   |
| 2 | $R_4 = +0.62268.f$ | $d_2 = 0.09801.f$ | $n_2 = 1.65830$ | $v_2 = 57.29$ |
| 3 | $R_5 = +0.23665.f$ | $d_3 = 0.01642.f$ | $n_3 = 1.65446$ | $v_3 = 33.79$ |
|   |   | $l_2 = 0.27818.f$ |   |   |
| 4 | $R_6 = -0.31542.f$ | $d_4 = 0.03665.f$ | $n_4 = 1.69895$ | $v_4 = 30.05$ |
| 5 | $R_7 = -5.25016.f$ | $d_5 = 0.09698.f$ | $n_5 = 1.69100$ | $v_5 = 54.80$ |
|   | $R_8 = -0.39150.f$ |   |   |   |
|   | $R_9 = +5.42416.f$ | $l_3 = 0.00341.f$ |   |   |
| 6 | $R_{10} = -0.92029.f$ | $d_6 = 0.05961.f$ | $n_6 = 1.74950$ | $v_6 = 35.00$ |

In the above table, $n_D$ is the index of refraction for D line of the spectrum, and $v$ is the dispersive index.

The powers of refraction of the lens faces are preferably as indicated in the following table:

| Lens Element | Powers of Refraction |
|---|---|
| 1 | $P_1$ of Face $(R_1) = +0.97491/f$ |
|   | $P_2$ of Face $(R_2) = -0.31749/f$ |
| 2 | $P_3$ of Face $(R_3) = +2.09343/f$ |
| 3 | $P_4$ of Face $(R_4) = -0.00617/f$ |
|   | $P_5$ of Face $(R_5) = -2.76552/f$ |
| 4 | $P_6$ of Face $(R_6) = -2.21593/f$ |
| 5 | $P_7$ of Face $(R_7) = +0.00151/f$ |
|   | $P_8$ of Face $(R_8) = +1.76501/f$ |
| 6 | $P_9$ of Face $(R_9) = +0.13818/f$ |
|   | $P_{10}$ of Face $(R_{10}) = +0.81442/f$ |

In the above table, the faces of the lens elements are identified by the associated radii.

It will be understood that each of the elements described above, or two or more together, may also find a useful application in other types of photographic objectives differing from the types described above.

While the invention has been illustrated and described as embodied in a photographic objective of high power for use with a miniature camera having a central shutter arranged between the objective and the picture frame, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A photographic objective having an aperture of

1:1.9, the objective being constructed substantially according to the specifications in the following table:

| Lens Elements | Radii | Thicknesses Air spaces | $n_D$ | $v$ |
|---|---|---|---|---|
| 1 | $R_1=+0.73853.f$ | $d_1=0.12463.f$ | $n_1=1.72000$ | $v_1=50.31$ |
|   | $R_2=+2.26782.f$ | $l_1=0.00103.f$ |   |   |
| 2 | $R_3=+0.31446.f$ | $d_2=0.09801.f$ | $n_2=1.65830$ | $v_2=57.29$ |
| 3 | $R_4=+0.62268.f$ | $d_3=0.01642.f$ | $n_3=1.65446$ | $v_3=33.79$ |
|   | $R_5=+0.23665.f$ | $l_2=0.27818.f$ |   |   |
| 4 | $R_6=-0.31542.f$ | $d_4=0.03665.f$ | $n_4=1.69895$ | $v_4=30.05$ |
| 5 | $R_7=-5.25016.f$ | $d_5=0.09698.f$ | $n_5=1.69100$ | $v_5=54.80$ |
|   | $R_8=-0.39150.f$ | $l_3=0.00341.f$ |   |   |
| 6 | $R_9=+5.42416.f$ $R_{10}=-0.92029.f$ | $d_6=0.05961.f$ | $n_6=1.74950$ | $v_6=35.00$ | wherein the first column lists six lens elements in numerals in order from the front to the rear; wherein $f$ is the focal length of the objective, $n_D$ is the index of refraction for the D line of the spectrum, and $v$ is the dispersive index; and wherein R, $d$, and $l$ refer, respectively, to the radii of curvature of the refractive surfaces, the axial thicknesses of the lens elements, and the axial air spaces between the lens elements, the subscripts on the characters R, $d$ and $l$ being numbered consecutively from the front to the rear, and the plus and minus signs in the second column corresponding to refractive faces of the lens elements which are respectively convex and concave to the front.

2. A photographic objective as set forth in claim 1 wherein the powers $P_1$ to $P_{10}$ of refraction $$\frac{n-n'}{R}$$

of the faces of the lens elements are substantially the values set forth in the following table:

| Lens Element | Powers of Refraction |
|---|---|
| 1 | $P_1$ of Face $(R_1)=+0.97491/f$ |
|   | $P_2$ of Face $(R_2)=-0.31749/f$ |
|   | $P_3$ of Face $(R_3)=+2.09343/f$ |
| 2 | $P_4$ of Face $(R_4)=-0.00617/f$ |
| 3 | $P_5$ of Face $(R_5)=-2.76552/f$ |
|   | $P_6$ of Face $(R_6)=-2.21593/f$ |
| 4 | $P_7$ of Face $(R_7)=+0.00151/f$ |
| 5 | $P_8$ of Face $(R_8)=+1.76501/f$ |
|   | $P_9$ of Face $(R_9)=+0.13818/f$ |
| 6 | $P_{10}$ of Face $(R_{10})=+0.81442/f$ | wherein the first column lists the six lens elements in numerals in order from the front to the rear, and wherein the second column lists the faces of the lens elements in order from the front to the rear, the subscripts indicating the radii of curvature of the respective faces of the lens elements, $f$ being the focal length of the whole objective, and wherein $n$ is the index of refraction of the light transmitting media on the side of the lens face toward the incident light, and $n'$ is the index of refraction of the light transmitting media on the side of the lens face toward the incident light.

3. A photographic objective as set forth in claim 1 wherein the rear intercept length of the objective is $0.63664f$, and wherein the objective has an angle of field of at least 44°.

References Cited in the file of this patent
UNITED STATES PATENTS

| 2,389,016 | Wynne | Nov. 13, 1945 |
| 2,416,032 | Warmisham et al. | Feb. 18, 1947 |
| 2,784,646 | Brendal et al. | Mar. 12, 1957 |

FOREIGN PATENTS

| 323,138 | Great Britain | Dec. 24, 1929 |
| 612,474 | Great Britain | Nov. 12, 1948 |
| 720,724 | Great Britain | Dec. 22, 1954 |
| 746,201 | Great Britain | Mar. 1, 1956 |